Nov. 17, 1925.

G. E. MARLATT

CRUCIBLE CHARGER

Filed Aug. 8, 1922

Inventor
George E. Marlatt

Nov. 17, 1925.    1,561,876

G. E. MARLATT

CRUCIBLE CHARGER

Filed Aug. 8, 1922    6 Sheets-Sheet 4

INVENTOR
George E. Marlatt

Nov. 17, 1925.

G. E. MARLATT

1,561,876

CRUCIBLE CHARGER

Filed Aug. 8, 1922   6 Sheets-Sheet 5

INVENTOR
George E. Marlatt

Patented Nov. 17, 1925.

1,561,876

UNITED STATES PATENT OFFICE.

GEORGE E. MARLATT, OF PASADENA, CALIFORNIA.

CRUCIBLE CHARGER.

Application filed August 8, 1922. Serial No. 580,448.

*To all whom it may concern:*

Be it known that I, GEORGE E. MARLATT, a citizen of the United States, residing at Pasadena, in the county of Los Angeles and State of California, have invented new and useful Improvements in Crucible Chargers, of which the following is a specification.

My invention relates to means for automatically replenishing the melting pots from which the material for type, typeslugs or other products is pumped, poured or otherwise withdrawn to form the product, the particular illustration and description thereof being in connection with slug-casting machines of the linotype class.

In connection with such machines, the main purpose of my invention is to equal or surpass the best possible practices of a careful operator or attendant not only in supplying feed metal to the melting pot at regular intervals under normal operating conditions, but also to automatically retard or advance the supply under varying conditions in order to maintain the temperature of the molten metal at the point best suited for producing varying sizes of slugs at varying speeds of production. Another purpose is to render the pot charger capable of feeding to the crucible metal in various shapes, such as standard-size pigs, slugs in miscellaneous sizes, and large ingots. Minor and contributing purposes will be set forth in the subjoined specifications and description of the accompanying drawings, in which:

Fig. 10ª shows a modified form of quantity regulator for the pot contents.

Fig. 13 shows a modification of the feed-control device as applied to the form of feeder illustrated in Fig. 12.

In its function as a temperature regulator this replenisher takes into consideration the permissible range of metal content in the crucible and the permissible range of temperature of the molten metal. Therefore, preliminary to a description of the feeder, the following explanation of the usual conditions and practices favorable to the production of good type-slugs is given to serve as a basis for an understanding of the description of the feeder and its operation. The temperature of the molten metal may range from 535° F. to 550° F., the higher temperature being favorable to the production of small slugs and the lower temperature favorable to the production of large slugs. The proper temperature is presumed to be maintained by the usual automatic gas or electric current regulator subject to such adjustment as an operator may make in changing for quantity production as between large and small slugs. Therefore, this invention is not concerned with the usual temperature range but rather with a departure therefrom due to failure of the usual regulator to function or because an operator misjudges the requisite temperature. In this connection, it may be noted that although a large slug requires a lowered temperature, nevertheless quantity production of large slugs would require a greater flow of gas (or electric current, if used) than quantity production of small slugs, due to the fact that the metal content in the crucible is more rapidly depleted and replaced in casting large slugs. Therefore the customary procedure would be to reduce the gas supply temporarily when changing to a large slug, especially if the temperature was above 550° F., in order to reduce the temperature of the metal, and then to increase the gas supply as production proceeded, in order to maintain the temperature. Regardless of the size of slug being cast, a large amount of molten metal in the crucible may permissibly be somewhat cooler than a smaller amount. This is because of the fact that if the metal is high in the pot and the temperature normal or low when a shift is made from a small to a large slug, then production may continue for a longer time than if the metal were low and the temperature low, the partially-filled pot being chilled more rapidly than a full pot by the addition of cold feed-metal. A pot barely full enough and barely hot enough to produce good small slugs would not produce good large slugs, for the reason that the larger mold cell would not receive enough metal from the "low pot" to displace the air in the mold, resulting in a porous slug; and, because of the distance between the surface of the metal in the pot and the mold cell 60, plus the air throat 62 and the mold cell 60, plus the air condition noted, the metal would be cooled before and while entering the mold, producing a chilled slug. But if the pot were normally full and the temperature high or even normal when shifting from a small slug to a large one, the face of the slug would be good, and sufficient air would be displaced from the mold, yet the slug would be porous or hollow for the reason that the large amount of hot metal in the mold would leak out of the usual air vents (not shown) before being sufficiently chilled by contact with the mold walls. Hence, the temperature of the metal should ideally be somewhat lower for a large slug than for a small one, and the pot full in order to best maintain the lowered temperature. In shifting from a large to a small slug the above-stated conditions and requirements would be reversed.

The usual linotype pot will hold about 40 pounds of metal, and under favorable conditions about one-third of this quantity may be withdrawn without deleteriously affecting the slugs being cast. This one-third represents a range between the top of the plunger well 90 and a ring 90' near the rim of the crucible. Therefore a favorable height for the molten metal would be a point midway between the top of the well and the ring. With the metal at this midway height the temperature could be reduced by merely adding cold metal, and it could be raised either by pouring in preheated metal (if available) from another pot, or by delaying replenishing the pot until the quantity of metal has been reduced to a point which would still produce good slugs. Standard size pigs of linotype metal weigh about 2½ pounds, equaling about 16 to a full crucible. Therefore, with the surface of the metal slightly below the midway point above mentioned, three pigs may be added at one time or in close succession without danger of overflowing the crucible. An operator producing small (news) slugs will use one pig about every 15 minutes and when producing large (book) slugs will use a pig about every 5 minutes. Hence, taking 10 minutes as the average, after an operator had deposited three cold pigs at one time, 30 minutes could elapse before the metal had receded to the midway point, and 60 minutes before it had receded to the lowest permissible point. It will be apparent that the temperature may be regulated to a large extent without changing the adjustment of the usual heat governor. A single cold pig will lower the temperature about 10° F. Therefore, if an operator had maintained the height of the metal at the midway point, but by reason of the machine standing idle or from other cause the temperature of the metal had risen above 550° F., he could, before starting to cast large slugs, reduce the temperature to about 535° F. by adding several cold pigs; and thereafter the same volume of gas which had maintained the higher temperature for small slugs would maintain the lower temperature for large slugs. The conditions and requirements may therefore be summarized as follows:

A "low pot" with a high temperature is the working equivalent of a "high pot" with a low temperature, provided small slugs are being produced, but for large slugs the "low pot" would leave too much air in the throat and mold to permit the plunger 89 to force the larger quantity of molten metal into the mold cell.

A pot that is full and barely hot enough for large slugs would not be hot enough for small slugs, for the reason that a larger proportion of the metal content of the small slug comes in contact with the walls of the mold, tending to chill the metal before it enters the character cavities of the matrices 56.

A pot that is full and cool enough for small slugs might be too hot for large slugs, for the reason that the larger quantity of metal would not cool quickly enough in the large mold cell to prevent its partial escape with the air through the air vents (not shown).

A pot that is "low" and barely hot enough to produce good small slugs might produce equally good large slugs for a limited time, but the addition of cold metal to replace the increased consumption for the enlarged slug would soon chill the metal, producing a slug with a poor face.

With the pot mouth 58 properly heated and properly vented for the escape of air from the mold, a medium full pot at a medium temperature will ordinarily serve for either large or small slugs, provided the pot is replenished at regular intervals to compensate for consumption of metal, and provided further that the usual temperature regulator is functioning properly.

It will be apparent that an ideal general use temperature lies about midway between the maximum permissible for producing good small lugs and the minimum permissible for producing good large slugs; that such a temperature is best maintained by replenishing the pot at regular intervals, and that any departure from such a temperature may be best prevented if the metal in the pot is at a medium height so that the amount may be increased or diminished temporarily.

Ordinarily, an operator could not anticipate the need of lowering or raising the temperature, but would wait until the necessity was indicated by the condition of the slugs being cast; therefore, a delay would ensue, as production of usable slugs would have to await the regulation of the temperature and cooling of the overheated mold. A purpose of the mechanism to be described is to automatically feed cold metal to the crucible at such intervals of time as will maintain a midway height of the metal provided the temperature is correct; to automatically advance the feeding of the metal when the temperature is too high; to automatically reduce the heat supply when the temperature remains too high with the pot full; and to either stop the feed or feed preheated metal when the temperature is too low. Hence, such a feeder will follow the best practices of an operator and will improve on such practices by automatically correcting a too high or too low temperature before the product is affected.

The storage portion of the feeder consists of two feed screws 1, 2 between which the feed metal is confined, and an inverted channel 3 on which the metal is supported. In the case of pigs 4 of the usual shape, each successive pig is engaged by each successive helix of the screws. The pitch of the screws is preferably determined by the size of the pigs, with the diameter about equal to the pitch, in which case the inclination of the thread is somewhat steeper than the engaged edge of the pigs when stacked as in Fig. 1, the discrepancy being in favor of the easy movement of the screw thread away from the pigs and in a direction which will not tend to wedge the pigs against the support 3. The screws are turned in opposite directions, being geared for the purpose by means of a gear 5 on the right-hand screw 1 and a similar gear 6 on the left-hand screw 2. At their rear ends the screws are supported in brackets 7 secured to the support 3 by means of bolts 8, 9. At the forward end the screws are supported in brackets 10 secured to the support 3 by means of bolts 11, 12. These forward brackets are flared outwardly below the center of the feed screws in order that they may not interfere when the metal is fed in the form of loose slugs 13. When loose slugs are to be fed a trough 14 is inserted beneath the feed screws, the shape of the trough in cross section being such that the slugs will tend to gravitate toward its longitudinal center between the screws. The forward end of the trough is provided with clearances 14' for engaging the front brackets 10 and is sufficiently short to permit of being so engaged after being inserted beneath the feed screws. When employed as a slug feeder a follower or chaser 15 is placed in engagement with the feed screws to scrape the trough 14 of slugs remaining out of engagement with the screws; but such engagement may be direct or indirect, the mass of slugs being carried along with those in actual engagement with the screws. This same follower 15 is used in controlling the feed of large ingots 16. Except for the equipment just noted and an end gate to be described the feeder proper need not differ whether employed as a pig feeder, slug feeder or large ingot feeder.

Figures 3, 4, 5:
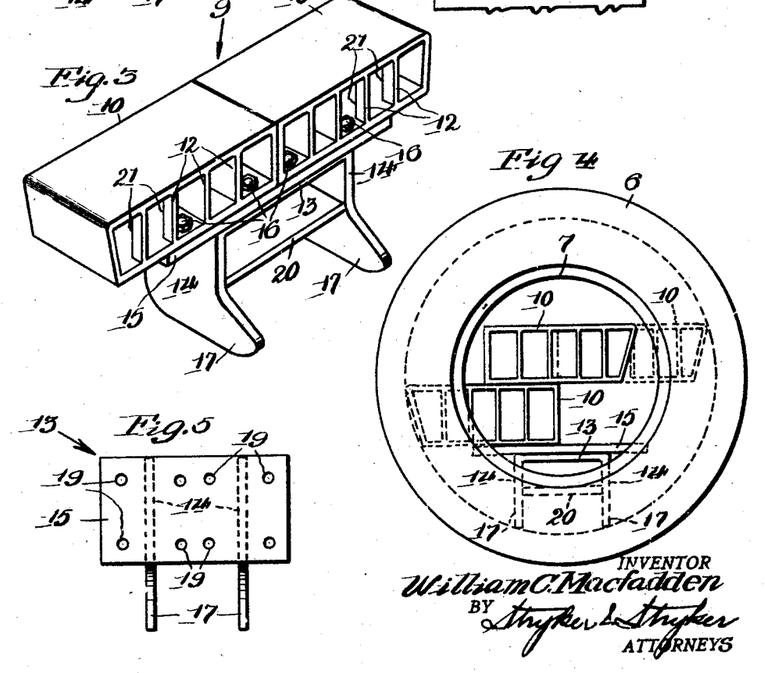
Fig. 3 is a view similar to Fig. 1, showing the feeder in horizontal position and containing loose slugs of feed metal for replenishing the crucible.
Fig. 4 is a front-end view of the feeder as it appears in Fig. 3.
Fig. 5 shows a follower and pusher device applicable in certain uses of the feeder.
Figure 3:
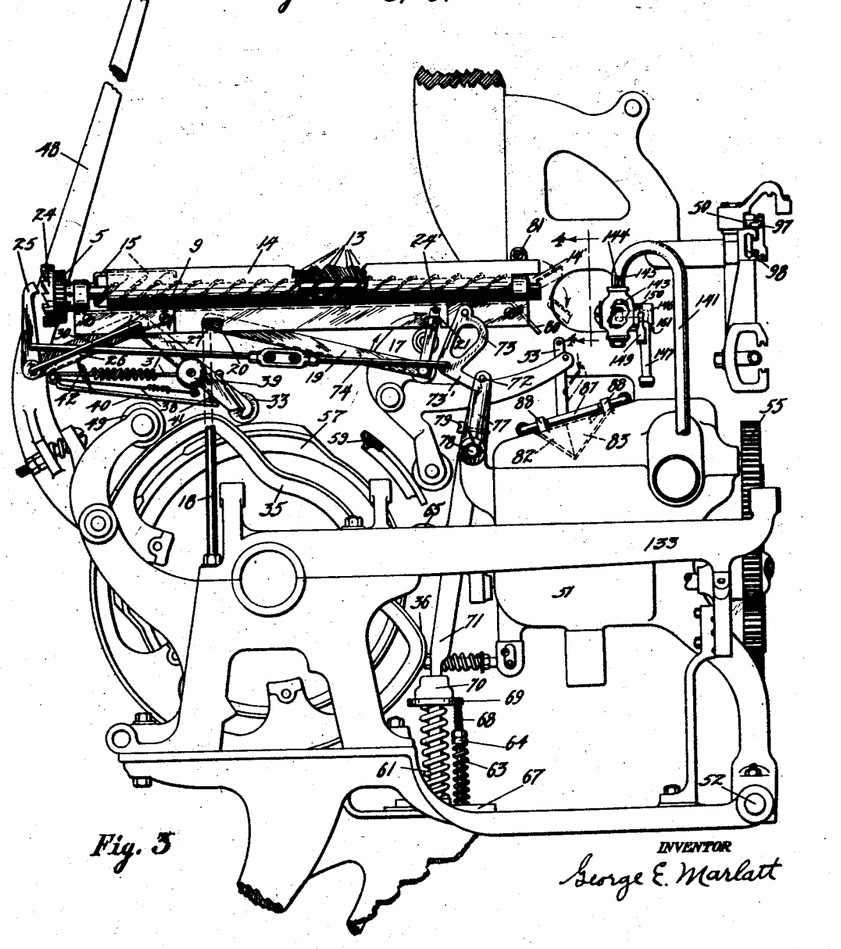
Figures 4, 6:
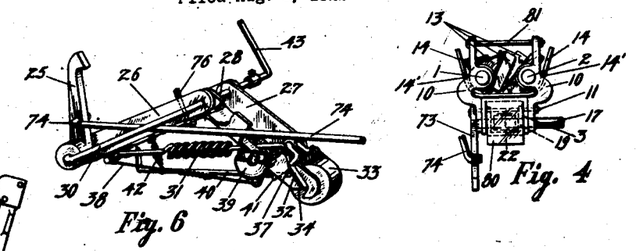
Fig. 6 is a perspective view of an operating lever and parts carried thereby.
Figure 6:
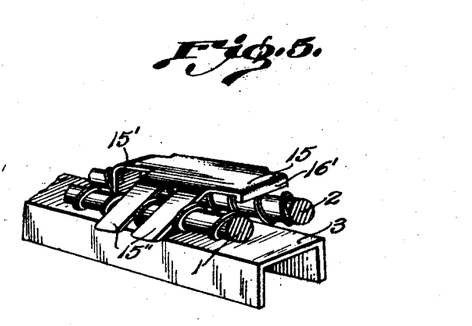
Figure 7:
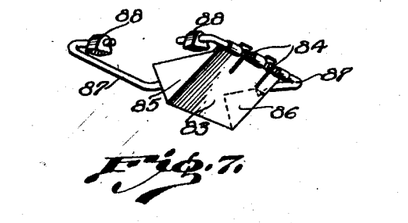
Fig. 7 shows the construction of a pot lid designed to break the fall of the feed metal and to automatically close the pot opening after each replenishment of the pot crucible.
Figure 16:
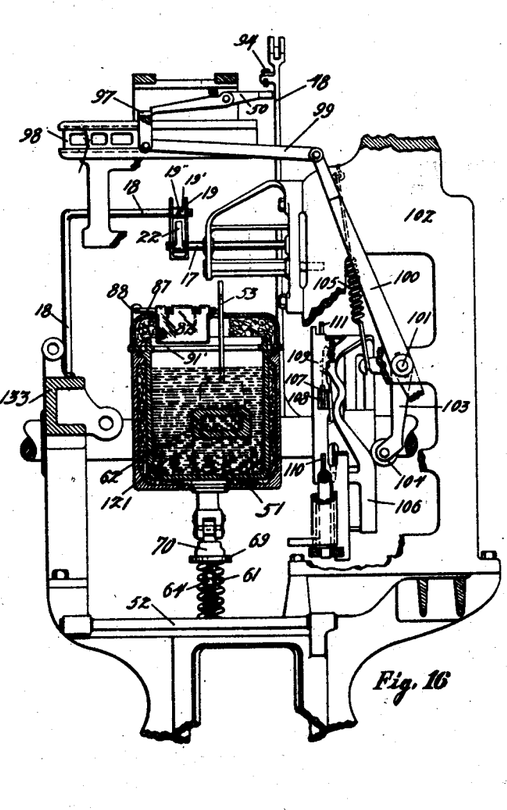
Fig. 16 is a fragmentary view from the front of a linotype machine, showing the melting pot in transverse section on the line 16—16 of Fig. 15, and includes the usual automatic stopping devices, under control of which the feeder and melting pot are brought in certain abnormal circumstances.

Forward of its center the feeder is supported on a replacement extension of a shaft 17 known as the mold-cam lever-handle shaft, which occupies the same position on various linotype machines and is therefore well adapted to the purpose of a support for this feeder. Rearwardly the feeder is supported on an upright 18 which displaces and serves in lieu of the usual cap screw occupying the same position in the machine frame. The upright 18 is bent to horizontal at its upper end and is braced from the forward support 17 by means of a channel 19 contained within the inverted channel 3. The brace 19 is permanent in the sense that it need not be removed in order to remove or raise the feeder and is secured to the support 18 by means of a spacer 19' and pin 19'' (Fig. 16). The inverted channel 3 is provided with open latches 20, 21, the slant and weight of the feeder serving to keep the latches in engagement with the supporting shafts. The forward support 17 carries a prop 22 which folds into the channeled brace 19 when the feeder is in its lowered position, and is used as a support for the feeder when in its raised position as a slug feeder (Fig. 3). The prop 22 is provided with a notch 23 which engages a cross-bolt 24' carried by the inverted channel 3. The bolt 24' is forward of the supporting shaft 17 so as to employ the weight of the feeder in keeping the rear latch 20 in engagement with the rear support 18 when the feeder is in raised position. The right-hand feed screw 1 carries a ratchet 24 having teeth about equal in number to the minimum number of slugs 13 contained in a pig 4 as determined by the size of the largest slugs. The ratchet 24 is intermittently engaged by a pawl 25 carried by the second link 26 of a cam-controlled lever 27. This lever 27 and its second link 26 are channel shaped, the one link fitting within the other at their intersecting ends. They are interconnected and joined to the inverted channel 3 by means of the upper horizontal angle 28 of a yoke 30, the lower angle 29 of which joins the pawl 25 to the lever link 26. The two links of the lever are so shaped at their adjoining ends as to limit the spacing of their outer ends one from the other, and are normally held so spaced by means of a spring 31. At one of its ends the spring 31 engages the lower angle of the yoke 30 and at its other end it engages a centrally pivoted secondary lever 32 which carries a cam roller 33. The spring 31 thus serves the two-fold purpose of keeping the two links of the cam-controlled lever normally in engagement and minimum spaced, and also of keeping the cam roller 33 seated between the sides of the lever 27 as determined by the engagement of the secondary lever 32 with seating notches 34 formed in the lever 27. A cam 35, common to linotype machines and known as the second elevator cam, is employed for controlling the lever 27 and, through the connections described, turning the feed screws 1, 2. It sometimes happens that, for reasons with which this invention is not concerned, the machine inclusive of the cam 35 is turned backward by hand. In such an event the cam roller 33 would lie in the path of the second shoulder 36 on the cam and be an obstruction. It is for this reason that the cam roller 33 is pivotally and resiliently mounted as explained. In the event of such an occurrence the cam roller would be forced partially around its pivot 37 and the periphery of the cam would pass through the space in the lever 27 vacated by the roller. With the cam again turned to normal and in the normal direction, the roller would be automatically seated by means of the spring 31.

Figure 1:
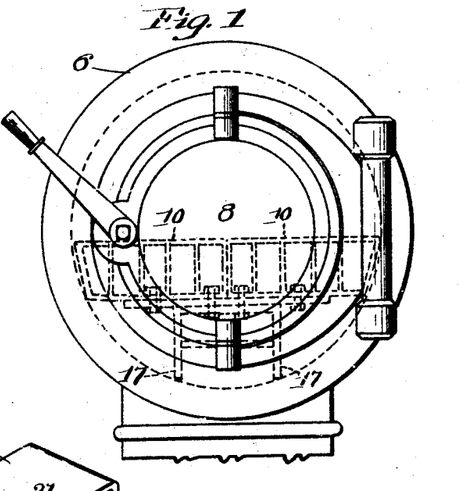
Figure 1 is a side elevation of the principal portion of a slug-casting machine of the linotype class, showing my device in operative position relative thereto and containing pigs of metal for replenishing the melting pot.

If, with the pawl 25 in engagement with the ratchet 24, any obstruction or unusual condition should prevent the turning of the feed screws 1, 2, then the spring 31 would stretch when the cam 35 engaged the roller 33. In such an event the increased separation of the ends of the links 26, 27 of the lever would cause a connecting rod 38 between the link 26 and a bell 39 on the relatively movable link 27 to sound the bell 39, thus notifying an operator or attendant of the abnormal condition. Simultaneously with the sounding of the bell, a member 40, one end of which is pivoted to the link 26 and the other held normally at rest beneath a shoulder 41 on the link 27, is raised by means of a spring 42 and its free end enters in front of the shoulder 41, thus holding the links of the lever in expanded relation and preventing a repetition of the sounding of the bell. With the parts thus held the feeder is rendered inoperative regardless of the initial cause of its inoperativeness, and may await the convenience of the operator before receiving attention. As hereinafter explained, the fact of the feeder becoming empty of feed metal would cause the bell to be sounded. An optional method of notifying an operator of a condition such as described is illustrated in Fig. 1 and consists of an arm 43 secured to the inner end of the upper angle of the yoke 30. Normally, the yoke 30 will rise and fall with the arm 26 at each rotation of the cam 35. But the conditions causing the expansion of the lever will leave the arm 43 in its upper position with the notch 44 in the path of a pin 45 carried by a swinging member 46 pivoted by means of a screw 47 to the usual second elevator arm 48. When the second elevator 48 descends under control of its cam 35, the pin 45 will miss the notch 44 provided conditions are normal; otherwise the pin will seat in the notch, holding up the elevator until the full contour of the cam 35 has cleared the roller 49. At this point the second elevator, would normally, have descended and tripped a detent 50 as a condition for the continued rotation of the machine; but failure of the elevator arm to descend will cause the machine to stop, thus notifying the operator of an abnormal condition which must be remedied before operation of the machine may continue. The detent 50 is a link in a safety device system common to linotype machines and more fully explained hereinafter.

All the mechanism so far described functions in like manner whether the feeder contains pigs, slugs or a single large ingot of feed metal. With the feeder raised for use as a slug feeder the cam roller 33 would automatically assume a position relative to the cam 35 which would cause the pawl 25 to function without special adjustment, but the arm 43, if employed, would need to be adjusted accordingly when raising or lowering the feeder, provided it was intended to function, which would be a matter of choice with an operator. No damage would result to the feeder as a consequence of eliminating both the bell and arm 43, these being merely notifying devices. The cam 35 engages the roller 33 immediately upon commencement of each successive rotation of the machine, hence the feeder is operated prior to the forward movement of the melting pot toward the mold 54.

I provide four methods for making and breaking the connection between the pawl 25 and ratchet 24. One method depends upon the weight of the melting pot 51 as determined by the quantity of molten metal therein; a second method depends on a float controlled by the varying height of the metal in the pot regardless of the weight thereof; the third method is a combination of the first two, and the fourth method is a float in a mercury container, the float making and breaking the feed-control connection regardless of the varying weight of the melting pot or the temperature of the contents of the pot. Any one of these methods may be employed regardless of whether the feeder is supplied with pigs, slugs or single ingots, but for convenience in illustration different methods are shown in connection with different uses of the feeder. In connection with melting pots which are not movable, only the float principle may be employed. In linotype machines the melting pot is pivotally mounted on a shaft 52; prior to the action of the pump 53 for forcing metal into the mold 54, the mold carrier 55 is moved forward a short distance into engagement with the matrix line 56; next the pot 51 is likewise moved forward by its cam 57 until the vented mouthpiece 58 through which the metal passes, is in close contact with the mold 54, whereupon the pump 53 descends under control of the pump cam 59, forcing the molten metal into the mold cell 60 and against the matrix line 56, thus forming a printing slug. The pot is balanced to an extent by the usual balance spring 61. This spring is intended to have but little effect when the pot mouth is leaving the mold 54 following a cast, the weight of the pot being utilized to break the sprue left by the gate perforations of the mouthpiece 58, the sprue either being pulled out of the perforations or broken from the slug as the pot recedes, being subsequently trimmed from the slug. Hence the usual balance spring 61 does not bear the full weight of the pot at any time, but permits it to rest against the most reduced portion of its cam 57 when the machine is in normal position. In order to utilize the varying weight of the pot for controlling the operation of the feeder under description, I provide an auxiliary balance spring 63, which may be in close proximity to the usual spring, as shown, or in any other convenient position. The tension of this spring may be regulated by means of tension adjusting nuts 64 so that it will, in co-operation with the usual spring, fully bear the weight of the pot and hold it away from the most reduced portion of the cam 57 when the pot is less than full of metal. When the metal in the pot is at maximum height the cam roller 65 may bear lightly against the cam, but not necessarily so. The auxiliary spring 63 has no effect when the pot is forward against the mold or breaking away therefrom, its range of action being limited by limiting nuts 66 which stop against a plate 67 as the pot moves forward. The spring rod 68 is guided in the plate 67. At its upper end the rod 68 bears against a plate 69 interposed between the usual balance spring 61 and a cap 70 which connects the spring to the pot lever 71. As thus constructed, when the pot is moved forward the auxiliary spring will support its weight only until the limiting nuts 66 contact with the plate 67, whereupon a gap will exist between the end of the spring rod 68 and the upper plate 69, leaving the pot normally heavy in its forward position for the purpose stated. A medium height for the metal in the crucible having been determined, the tension of the spring is adjusted by means of the nuts 64 to cause the pot-cam roller 65 to remain a slight distance away from the cam 57 when the metal is at medium height. Under these conditions a contact pin 72, movable with the pot, bears against a sling 73 which is connected by means of a rod 74 to the pawl 25. The connecting rod 74 is adjusted for length by means of a turn-buckle 75 so that with the metal in the pot normally high the pawl 25 will be held out of engagement with the ratchet 24. As the pot becomes light following successive casts of metal therefrom, the pot will settle a greater distance away from its cam following each return from the mold, and through the connections described will therefore permit the pawl 25 to engage the teeth of the ratchet 24; thereupon at each rotation of the machine the ratchet will be turned one tooth, gradually advancing the pigs 4 until the feed screws have made a complete rotation, when the foremost pig will be freed from engagement with the feed screws and will drop into the pot. The weight of the pig thus freed will again weight the pot sufficiently to cause it to settle close to its cam, and the pawl 25 will accordingly be disengaged from the ratchet 24. The number of teeth in the ratchet 24 is immaterial provided it is less than the number (about 8) of largest slugs contained in a pig of metal, for otherwise the screws would not be turned fast enough to supply metal for such maximum size slugs. The stroke of the pawl 25 may be regulated by means of an adjusting screw 76 in the lever link 26 and stopped against the bolt 8, and the measurements may be such that the screw may be adjusted to cause the pawl to engage only alternate teeth of the ratchet when unusually large slugs are to be cast in quantity. The contact pin 72 is carried by an arm 77 mounted on an extension of the usual pot hinge pin 78. The arm and pin may be knurled and broached as shown, to render the arm positively adjusted in co-operation with the adjustments previously described, and a clamping screw 79 serves to additionally tighten the arm on the hinge pin. The front end of the feeder floor is bent downward to form an apron 80 for supporting and guiding the feed metal as it is freed from the feed screws and approaches the pot opening. The pigs are prevented from possible tilting by a cross-bolt 81 supported by extensions of the brackets 10, the bolt being at a height to engage the upper ends of the pig as its lower end engages the apron 80. In order that the pigs may not enter the pot with too much force I provide a self-closing lid upon which they drop in entering the crucible. This lid is preferably formed in two halves 82, 83 each of which is controlled by springs 84 which may be of such strength as to best control the weight of the pigs as they enter the pot. The lid halves are each provided with end walls 85, 86 so that when the lid is closed a pit or hopper is formed into which the pigs or slugs may drop with security, and yet permit the pot to be normally closed to confine the heat. The lid halves are each self hinged to a frame 87 encompassing the pot opening and terminating as hinge pins in the usual lugs 88, so that the lid may be opened manually and swung forward to provide ample access to the crucible for the purpose of skimming the metal and cleaning the plunger 89. The rear walls 86 of the lid halves have their upper edges terminated beneath the frame wire 87, the frame thus limiting the distance to which the springs 84 may return the lid halves.

Figure 2:
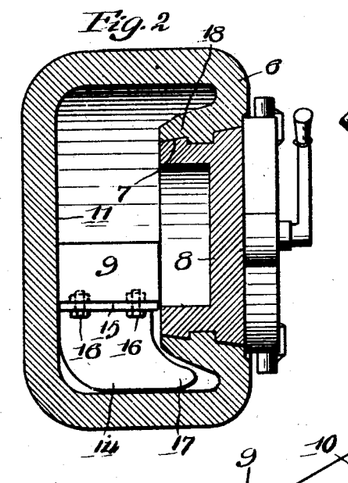
Fig. 2 shows a modified form of a notifying device included in Fig. 1.

Unless cleaned at appropriate times, the plunger 89 will bind in the well 90, due to the accumulation of oxides and dross. If the condition is not remedied in time the plunger is removed with difficulty, due to the fact that the heaviest accumulation of dross is near the top of the well, especially if the metal has been permitted to get low. This same condition will sometimes prevent the pot returning the full distance towards its cam, because of its weight being partially sustained by the fouled plunger. Since such a condition would defeat the purpose of the auxiliary balance spring 63 it is therefore a purpose of this invention to provide means whereby an operator may be notified of a fouled condition of the plunger. To this end I secure to the pot by means of a screw 91 an arm 92, and on the second elevator arm provide a pawl 93. Normally the pawl 93 will clear the end of the arm 92 when the elevator descends, permitting an abutment screw 94 to trip the detent 50 as a condition for the continued rotation of the machine. But if the pot remains forward by reason of a fouled plunger or an abnormally light pot, or from other cause, then the pawl 93 will engage the end of the arm 92 and the complete descent of the elevator arm will be hindered, resulting in the stopping of the machine as notice to the operator that an abnormal condition exists. If preferred by an operator the sounding of a bell 95 (Fig. 2) may serve instead of actually stopping the machine, contact of the pawl 93 with the bell lever 96 causing the bell to sound. If the operator knows the cause of the bell sounding and the product is not affected, the condition may then await the convenience of the operator before being remedied, or an attendant may supply metal to the feeder or pot without disturbing the operator. A pawl spring 93' prevents any binding of the pawl during the return movement of the elevator arm. The detent 50 rises and falls in front of a projection 97 integral with the usual transfer slide 98 which is connected by means of a link 99 to an arm 100 secured to a shaft 101. At the rear of the supporting column 102 the shaft 101 is provided with an arm 103 and cam roller 104. A spring 105 normally keeps the roller 104 in engagement with its cam 106, and as the cam turns the roller 104 will cause a safety pawl 107 to be forced backward into a recess 108 in the cam 109. When thus operating normally the pawl 107 will miss a stopping lever 110 and the machine will complete its rotation, being finally stopped by a stopping pawl 111 coming to rest on the stopping lever 110 and disconnecting the clutch arms 112 from the clutch drum 113, all in the manner well known in the art. But if the detent 50 is not tripped to free the slide 98, then the roller 104 cannot engage the depressions of its cam and the pawl 107 will remain in the plane of the stopping lever 110 and will come to rest thereon, disconnecting the clutch arms from the clutch drum and stopping the machine. The abnormal condition causing the machine to be stopped having been remedied the slide 98 is then eased over manually, causing the roller 104 to knock the pawl 107 from the stopping lever 110, whereupon the machine will complete its rotation. Hence the usual safety devices serve to stop the machine when the specified abnormal conditions affect the metal pot or feeder.

Figure 8:
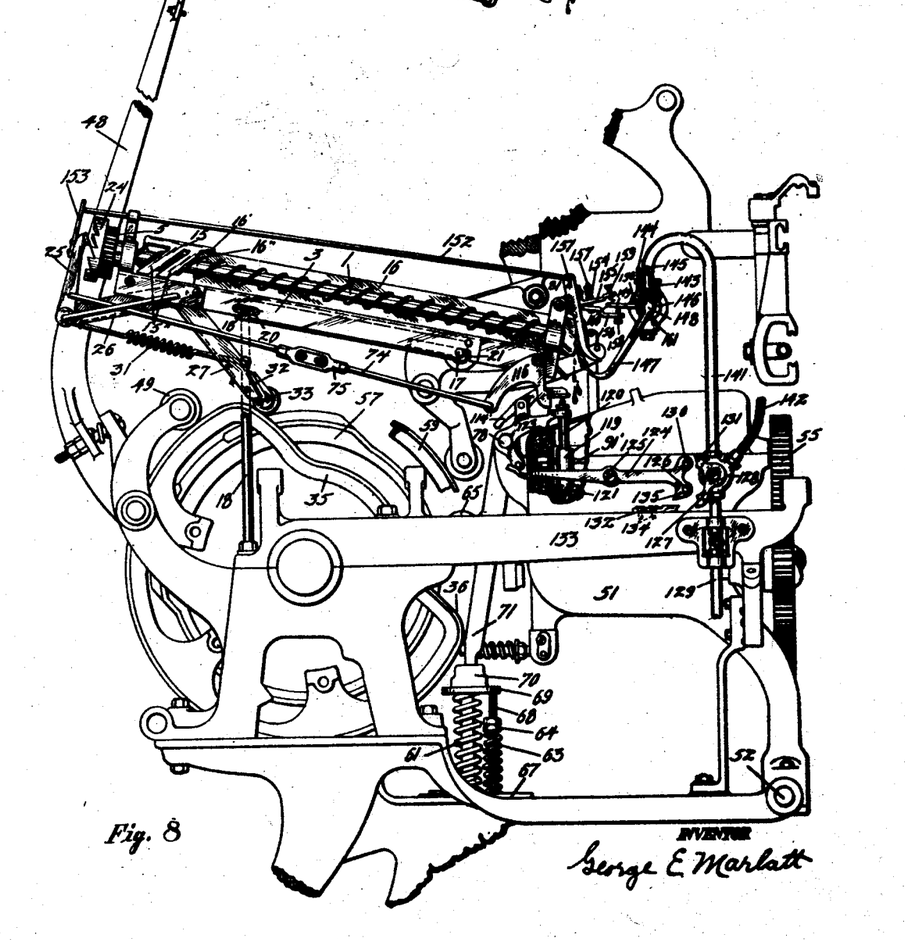
Fig. 8 is a view similar to Fig. 1, showing the feeder in use in connection with a gas torch as a preheater for the feed metal. This view also shows the usual small pigs of metal displaced by a single large ingot. The view also shows a combined temperature and quantity regulator for the pot contents.
Figure 9:
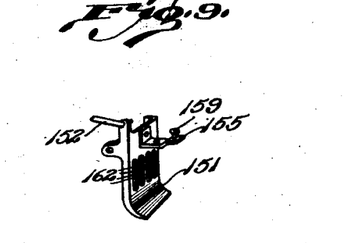
Fig. 9 shows a detail from Fig. 8.
Figure 10:
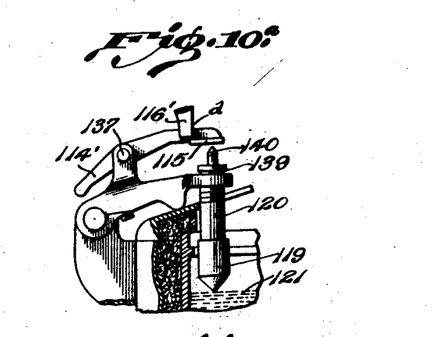
Fig. 10 is a fragmentary view, partly in section, of the combined feed control and temperature control device.

The means for advancing and retarding the feed of replenishing metal is illustrated in Figs. 8 and 10 and is an elaboration of the feed control principle already described. In this form of control the contact for determining the engagement and disengagement of the pawl 25 with the ratchet 24 is a pivoted member 114 having a side shoulder 115 for engaging the sling 116. The contact edge of the sling is formed in three steps a, b, c. The middle step b co-operates with the contacting shoulder 115 when the metal is normal both as to height and temperature; the lower step a receives the contact when the temperature is low or the metal is low or in the case of both conditions combined; the upper step c is a clearance preventing a contact when the temperature is high, so that a maximum amount of cold metal may be fed to cool the pot contents. The pivoted arm 114 is under direct control of a hollow inner float 117 buoyed in a quantity of mercury 118 in a container bulb 119 and tube 120. With the metal 121 in the pot at a medium height the bulb 119 will be partially immersed therein and if the temperature of the metal is correct (between 135° F. and 150° F.) the inner float 117 will hold the contact shoulder 115 in front of the middle step b, and in manner as hereinbefore explained will make and break the engagement between the pawl 25 and ratchet 24 according to the weight of the pot as determined by the amount of metal therein. If the temperature should become too low (below 135°) by reason of a shortage of gas or from any cause, then the shrinking of the mercury and attendant dropping of the inner float 117 will permit the contact shoulder 115 to fall in front of the lower step a when the pot next moves forward, and upon the return of the pot the pawl would be held disengaged from the ratchet 24 regardless of any depletion of the pot contents, thus preventing the feeding of cold metal to the already cooled pot contents. Usually the condition of the product would inform an operator of the extremely lowered temperature; but in any event as the pot became lighter the arm 92 would ultimately be retained in a forward position as a result of the lightened pot and in manner before explained would notify the operator of the abnormal condition. The horizontal measurement of the lower step a may be such that the arm 92 will be operative before the step a becomes non-effective due to an extreme forward position of the pot.

If the metal in the pot became too hot (above 550° F.) then the shoulder 115 would rise to a position in front of the upper step c and the pawl would remain in engagement with the ratchet, causing cold metal to be fed at each rotation of the feed screws and gradually reducing the temperature of the pot contents. But if the temperature were not sufficiently reduced when or before the metal rose to the safe height of the ring 91' then the mercury bulb 119 would become a float, rising with the molten metal until a shoulder 122 on the arm 123 remained in position to engage the lower step a upon return of the pot from the mold, whereupon the pawl 25 would be prevented from engaging the ratchet 24, stopping the feed. To this end the mercury container tube 120 is secured in the arm 123, which is loosely mounted on the hinge pin 78 as a pivot about which the bulb 119 rises or falls. Ordinarily the temperature of the metal would have been sufficiently regulated before the metal reached the ring 91'. In any event the feed will be discontinued at this point, as explained, and unless the product is affected by the high temperature, production could continue until the receding metal permitted the shoulder 122 to fall below the lower step a, whereupon, unless the shoulder 115 had also dropped in front of the middle step b, additional cold metal would be fed to the pot. As an additional precaution for preventing the temperature remaining high for any considerable length of time, I provide means for automatically reducing and subsequently restoring the gas (or electric current) supply, as follows: The float arm 123 is counterbalanced to an extent by a pivoted arm 124 mounted on the jacket of the melting pot by means of a pivot screw 125. The rear end of this arm 124 bears beneath a pin 126 in the float arm 123. As the bulb 119 rises with the metal in the pot the forward and heavier end of the arm 124 falls until a pin 126 projecting therefrom lies in front of an extension 127 integral with a valve 128 in the gas-supply pipe 129, whereupon when the pot moves forward the pin 126 engages the valve projection 127 and partially closes the valve opening, reducing the gas supply. Meantime another pin 130 will have dropped below a valve-closing projection 131, preventing the valve being closed until the float arm 123 has dropped with the receding metal; when the metal has receded sufficiently the pin 130 will return to a position in front of the valve projection 131 and upon a subsequent forward movement of the pot the valve 128 will be again opened, increasing the gas supply to normal. When the source of heat is electric current instead of gas a suitable electric switch may displace the valve 128. In order that an operator may be notified of the extreme temperature condition calling for a reduction of the heat supply, I provide as follows: A catch-block 132 is secured to the machine frame 133 by means of screws 134; the arm 124 is provided with a hook portion 135; when the forward end of the arm 124 drops due to high metal at a high temperature, the hook will, upon a subsequent forward movement of the pot, engage the catch-block 132, thus retaining the pot in a forward position. The arm 92 will then function in the manner hereinbefore described, and cause the machine to stop or the bell 95 to be sounded. This device may be used either in conjunction with or in lieu of the special valve 128. The proper weight of the float for causing it to rise with a maximum height of metal may be regulated by the total amount of mercury in both the outer container 119 and inner container 117. The total weight having been determined, a sufficient proportion of the mercury is then placed within the inner tube 117 to cause this member to retain the shoulder 115 at a normal height under normal temperature conditions. An opening 136 in the inner float permits the mercury to be readily transferred from one to the other container until the proper proportions are determined. Depressing the inner tube toward the bottom of the bulb 119 will cause the mercury to rise around the inner tube until a portion enters the opening 136. If too much mercury enters, the tube may be removed after first removing the lever 114 and a portion of the mercury poured back into the outer container. The lever 114 is suitably counterbalanced and limited in its movement by an extension 114′ beyond the pivot 137. A loose cap 139 serves to guide and center the inner tube 117, and a tapered plug 140 is the direct support for the lever 114. The bulb 119 may be provided with an aluminum jacket 138 as an aid in overcoming any tendency of the molten metal to cling to the bulb. The outer tube 120 is threaded into the arm 123, as a provision for regulating the extent of immersion of the bulb 119 in the molten metal when at medium height. The indicated relative measurements and proportions of the mercury containers and associated parts may be liberally construed in order to effect the desired results.

A modification of the pot-contact principle of feed control is shown in Fig. 10ª. In this form of control the auxiliary pot-balancing spring may be omitted and the pot permitted to return the usual entire distance to a position of rest against its cam. The outer mercury container is partly immersed in the molten metal when the pot is sufficiently full, and when the metal recedes to a point below the bulb the resultant falling of the float within the mercury container will cause the shoulder 115 to drop below a vertical shoulder $d$ on the sling 116′, thus permitting the pawl 25 to engage the ratchet 24, and releasing the replenishing metal; the resultant rise of the metal in the pot will thereupon again immerse the mercury container, causing the float 117 to rise and the shoulder 115 to remain in front of the vertical shoulder $d$, stopping the feed. This may be considered an improvement over types of floats immersed directly in the molten metal for regulating the height thereof, but does not suffice for regulating the temperature since it is not effective to advance or retard the feed. In this construction the position of the mercury-floated shoulder 115 and not the weight of the pot registers and controls the height of the molten metal.

When the feeder is in raised position for use as a slug feeder, an extension 73′ of the sling 73 provides for the contact with the pin 72. A sufficient number of the slugs 13 will engage the threads of the mass of slugs to 1, 2 to cause most of the mass of slugs to move forward as the screws rotate; such slugs as are not thus carried forward will be collected in front of an end portion 15′ of the follower 15. This end portion is centered between the feed screws in engagement therewith, while other engaging members 15″ enter the screw threads on the outside thereof. When the follower has been carried forward and stopped against the front brackets 10 the rotation of the screws will thereby be resisted, the spring 31 will stretch and the operating lever will be expanded, permitting the rod 40 to enter in front of the shoulder 41, and the bell 39 will be sounded, all in the manner hereinbefore described, thus notifying the operator or attendant that the feeder is nearly empty of slugs.

For use with the feeder as a preheating or melting feeder employing large ingots 16, the follower 15 is provided with a lip 16′ which engages a notch 16″ cast in the ingot. The follower will thus either retard or push the ingot according to the inclination of the feeder relative to the horizontal. The premelting device now to be described will operate in similar manner whether the feeder contains small pigs as shown in Fig. 1 or large ingots as in Fig. 8, but ordinarily, in use with the small pigs, it would be employed merely to heat and not necessary melt the pigs. In this connection it may be noted that feed metal in any shape would be preheated to a limited extent by reason of the front of the feeder terminating above the melting pot and receiving the heat radiated therefrom.

Where gas is employed as the source of heat the preheater may be suspended from an extension 141 of the usual supply pipe 129, the usual gas governor (not shown) receiving gas from a tube 142 after the gas has passed through the special valve 128 hereinbefore described. The preheater is designed to be readily turned into or out of operative position by a quarter turn thereof on the supply pipe extension 141. To this end the valve holder 143 is provided with a stop pin 144 which is stopped against a stopping pin 145 in the pipe 141 when the preheater is in non-operative position as in Fig. 3. An extension of the valve 146 carries a torch 147 in communication with the valve chamber 148. The valve extension is also provided with a limiting stem 149 which is stopped against a pin 150 in the valve holder when the valve is fully open. The opening and closing of the valve is controlled by an end gate 151 which is dependent on the forward movement of the feed metal for its valve-opening movement, and upon the melting away of the metal for its valve-closing movement. The metal is advanced by the feed screws in the manner previously described, its movement commencing when a sufficiently depleted pot causes the pawl 25 to engage the ratchet 24; but the rotation of the feed screws is stopped when a rod 152, controlled by the end gate 151, contacts with an extension 153 of the pawl 25. A movement of the feed metal sufficient to thus cause the disengagement of the pawl 25 is more than sufficient to fully open the valve 146, the additional movement of the gate after the valve is open being permitted by compression of a spring 154. The gate has secured thereto a relatively rigid bracket 155, to which a relatively movable member 156 is normally held in parallel alinement by means of the spring 154 and spring rod 157. An abutment screw 158 carried by the movable member 156 serves to open the valve as the gate swings outward, and the upper abutment screw 159 carried by the rigid member 155 partially closes the valve when the metal melts away, permitting the gate to close; but after the valve is fully open the gate continues to move forward until an appreciable space 160 intervenes between that stem 149 and the closing screw 159; hence the valve will remain fully open for a time after the metal commences to melt, before the valve-closing screw 159 again engages the stem 149, whereupon the valve will be gradually closed and the torch 147 gradually moved downward and away from the feed metal until melting ceases. Thereafter, whatever flame remains will merely keep the end gate and adjacent feed metal warmed. In order to fully extinguish the torch flame the preheater must be turned to non-operative position, out of engagement with the abutment screws 158, 159, when the valve may be entirely closed by turning the torch downward until it is stopped against a stop pin 161. The end gate is provided with corrugations or flutes 162 to permit the spreading of the torch flame across the end of the feed metal.

Figure 11:
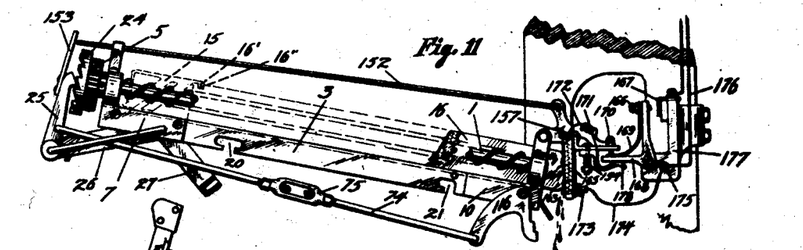
Fig. 11 is a view of the feeder differing from the showing of Fig. 8 only in the fact that the preheater is of electric type.

In case electric current displaces gas as the source of heat for the melting pot, the preheater may be of electric type as illustrated in Fig. 11. As shown, the resistor wire or ribbon 163 is confined between two plates 164, 165 of the end gate. The advance of the feed metal causes a terminal screw 166 to contact with a terminal block 167; thereafter the end gate continues to move forward until a timing space exists between the insulating arm 168 and a conductor spring 169 which remains in engagement with the abutment screw 170 in the insulating bracket 171; a conductor wire 172 connects the screw 170 to the resistor wire 163 and the circuit is completed through a terminal plug 173, the wire 174, binding screw 175 and return wire 176. The circuit having been made, melting will continue until the feed metal has been reduced sufficiently to permit the abutment screw 170 to force the conductor spring 169 against the arm 168, whereupon the terminal screw 166 will be moved, breaking the circuit. The tendency of the spring 154 to keep the bracket 171 and abutment 178 in alinement also serves to keep the end gate against the feed metal as melting proceeds. A bracket 177 supports the heating unit from a convenient adjacent part of the machine frame, and the heater may be rendered inoperative by withdrawing the terminal plug 173. The feeder may be freed for raising or removal by turning the circuit-closing abutment 178 to a non-interfering position about the spring-rod 157.

When the feeder is employed as a melting feeder the pot lid may be left open, permitting the metal to drip directly into the crucible.

Figures 12, 14, 15:
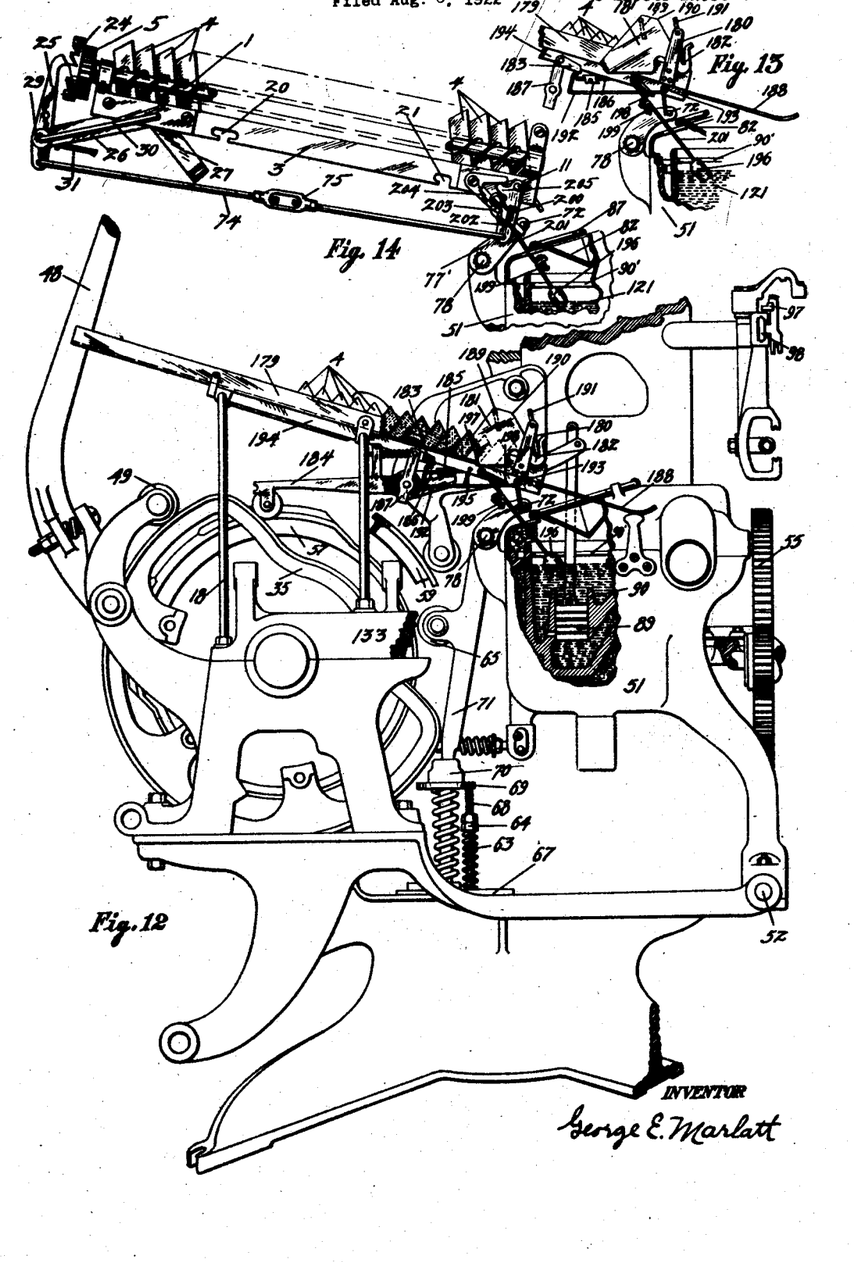
Fig. 12 shows the feed-control feature of this present invention applied to an earlier type of feeder.
Fig. 14 shows a modification of the feed-control feature applicable to the feeder shown in Figs. 1, 3 and 8.
Fig. 15 is a plan view of the feeder in operative positions as in Fig. 1, and in relation to the usual safety stop devices of a linotype machine.
Figure 15:
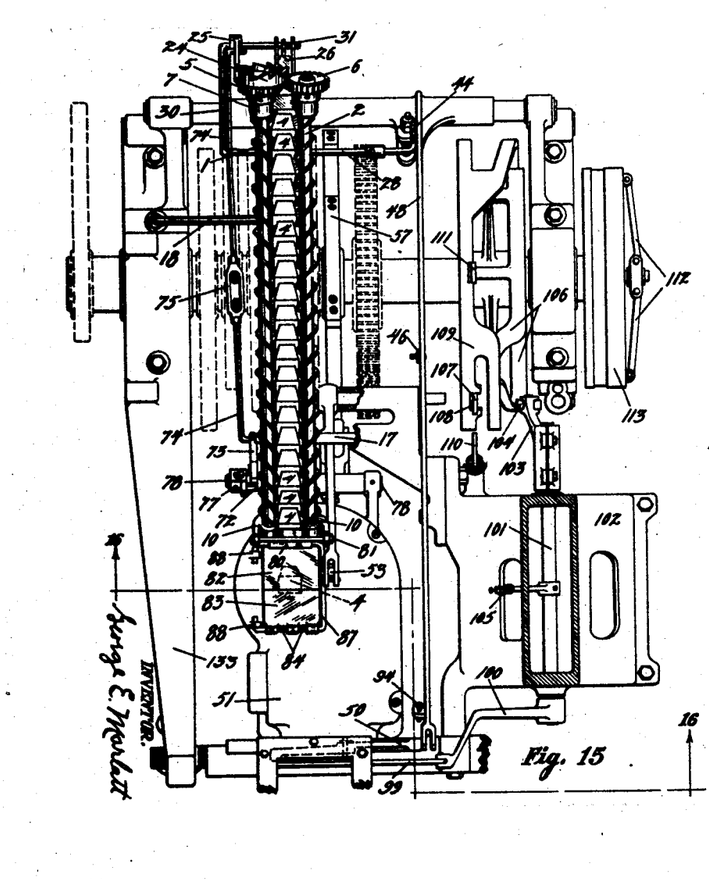

In Fig. 12 is illustrated the application of the balanced-pot principle of feed-control to a form of feeder disclosed in my U. S. Letters Patent No. 1,215,677, issued February 3, 1917. In this form of feeder the pigs of metal are stored in the inclined channel 179 against an end gate 180. At opposite sides of the feeder a releasing lever 181 engages a rod 182 secured to the end gate 180. A dog 183 makes and breaks the connection between a cam-controlled operating lever 184 and the releasing lever 181, the dog intermittently engaging a catch-block 185 supported in the floor 186 of the releasing lever. When this catch-block is engaged by the dog the operating lever and releasing lever are in effect one centrally-pivoted lever and the rotation of the cam 35 will cause the forward lever 181 to be tilted about the pivot 187, freeing the horizontally-hung gate 180 and permitting the forward pig of metal to slide from the channel 179 to an apron 188 and thence into the melting pot, all in manner similar to that described in said letters patent. When the cam 35 completes its rotation a spring (not shown) restores the releasing lever, shoulders 190 thereon engaging extensions 191 of the end gate and insuring the reengagement of the gate by the releasing lever. A cross-bar 189 meanwhile enters in front of the unreleased pigs and prevents their escape. As described in said Letters Patent No. 1,215,677 connection between the dog 183 and catch-block 185 is made and broken by means of a float falling and rising with the metal in the melting pot. In the present disclosure I combine the weighing principle with the float principle of feed control, so that in the event of either device failing to function properly, the other will insure proper response to the rising and falling of the metal in the pot. A control lever 192 is pivoted on a pin 193 secured in the supporting frame 194. At its rear end this lever supports the dog 183, a spring 195 serving to normally hold the dog out of engagement with the catch-block 185; but when the metal in the pot becomes low and the pot as a consequence remains forward, the contact pin 72 will free the control lever 192 and the weight of the float 196 will overcome the spring 195, permitting the dog 183 to engage the catch-block 185, whereupon the releasing lever will be tilted and a pig released as explained. To this end the float rod is pivoted on a pin 197 and has an extension 198 shaped to bear upon the control lever 192 with increasing force as the metal in the pot becomes low. Failure of the pot to remain forward when the metal is low will prevent the float from functioning, contact of the pin 72 with the control rod overcoming the tendency of the float to depress the control rod; and any tendency of the float to drop regardless of a sufficiently full pot will not of itself cause a pig to be released, for the sufficiently weighted pot would overcome such tendency. For example: if a fouled plunger 89 should hold the pot slightly forward as hereinbefore explained, the float could function nevertheless and a pig would be released with the depletion of the pot; and if a newly-delivered pig should fail to become immersed sufficiently to cause the float to respond prior to a succeeding rotation of the cam 35, the pig could nevertheless weight the pot sufficiently to prevent a second pig being immediately released. Any failure of the pot to return the distance indicated by its weight will of itself tend to prevent a second pig immediately following a partially immersed pig, due to the fact that the metal rises with the pot about its pivot 52; hence a forward position of the pot will have the partial effect of a newly immersed pig, and tend to prevent a premature dropping of the float. A resilient connection 199 prevents damage to the parts in the event that the pot is moved while the metal is solidified.

A modification of the combined float and pot-contact principles of feed control is shown in Fig. 13. In this showing the dog 183 will drop of its own weight when permitted to do so by reason of the float falling with the receding metal; but if the float should fall regardless of the pot being sufficiently heavy with metal, then the sufficiently weighted pot would nevertheless prevent the dog 183 engaging the catch-block 185; and if the pot should remain forward regardless of its being sufficiently heavy, the float could nevertheless hold the pawl 183 out of engagement with the catch-block 185. To this end, the extension 198 of the float rod is beneath the control lever 193, and the spring 195 is omitted.

The application of the combined float and pot-contact principles of feed control to the form of feeder particularly described herein is illustrated in Fig. 14. In this illustration it will be noted that the sling 200 is connected to the pawl 25 as before described, except that the connecting rod 74 engages the pawl below its pivot 29. The float 196 is suspended from the sling 200, the float rod 201 being formed with various shoulders and depressions for resiliently engaging a staple 202 and pin 203, so that the float may be readily removed when the feeder is in raised position as a slug feeder. When so raised the arm 77' may be readjusted about the pot hinge pin 78 to provide the necessary contact either with the sling or an auxiliary lever 204. This auxiliary lever engages a shoulder 205 of the sling 200 and when the pot is sufficiently heavy with molten metal the engagement of the contact pin 72 with the lever 204 will keep the pawl 25 out of engagement with the ratchet 24. Failure of the pot to settle back to the extent indicated by the weight of its contents will not of itself permit the pawl 25 to engage the ratchet 24, for the proper height of the metal will retain the float at a corresponding height and thus hold the pawl 25 inoperative; also, any tendency of the float to fail to rise with newly-fed metal will not of itself cause the pawl 25 to become or remain operative, for the weight of the pot will overcome any such tendency of the float; and, as before explained, if the pot remains forward regardless of its containing sufficient metal, the metal will be correspondingly high relative to the float pivot 11, thus tending to raise the float regardless of a limited immersion of newly delivered metal. Although shown and described in combination with the pot-contact principle of feed-control, it will be apparent that the float principle will of itself serve to control the feed and therefore adapts the feeder to use with melting pots which are not adapted to the contact principle by reason of being stationary when in use. It may be also noted that the combined principles of feed-control does not prohibit the employment of the mercury-controlled float hereinbefore described, as a temperature regulator.

Having described my invention and its use, I claim as new and desire to secure by Letters Patent:

1. In a crucible charger, in combination, a melting pot to be replenished, an inclined semi-gravity support for pigs of replenishing metal for said pot, and a pair of coacting conveyer screws inclined with said support toward said melting pot for conveying the pigs of feed metal thereto, successive turns of the threads of said screws engaging successive pigs of metal so that said pigs of metal may be either advanced and released individually into the melting pot or retarded against gravity regardless of the inclination of their support.

2. In a crucible charger, in combination, a trough for supporting a loosely-spread mass of slugs of type metal for deposit in a melting pot, and a pair of co-acting conveyer screws within said trough, successive turns of the threads of said screws engaging and independently supporting successive divisions of the mass of slugs in said trough in order that the mass of slugs may remain evenly spread while being advanced toward and into the melting pot.

3. A combination as specified in claim 2, including also a follower in engagement with and capable of being advanced by the feed screws, said follower serving to collect and advance slugs remaining out of direct control of said screws, and being capable also of resisting the rotation of the feed screws when the slug-container is approximately cleared of slugs, for the purpose specified.

4. In a crucible charger, in combination, a pair of coacting conveyer screws between which an ingot of crucible-replenishing metal may be confined, a support for said ingot, a melter for melting said ingot, a crucible below said melter capable of receiving the metal melted from said ingot, a follower in engagement with said screws and with said ingot, means for rotating said screws to cause said ingot to be advanced under control of said follower and toward said melter intermittently according to the amount of metal in said crucible, and coacting means for rendering said melter intermittently operative or non-operative in time with the intermittent movement of said ingot on its support under control of the feed screws and said follower.

5. A combination as specified in claim 4, characterized by the fact that the follower recited therein is capable of causing resistance to the rotation of the feed screws when said ingot has been fully advanced on its support, such resistance serving to notify an operator that the ingot has been fully advanced, in the manner and for the purpose specified.

6. In a crucible charger, in combination, a support for feed metal, means for advancing the feed metal on its support, a crucible for receiving the feed metal, and a pit in the cover of the crucible into and through which the feed metal may drop from its support, said pit having hinged side and end walls capable of offering limited resistance to said feed metal in order to check the momentum thereof when it enters the crucible, and serving to close the pot opening following the entry of feed metal.

7. A combination as specified in claim 6, characterized by the fact that the walls of the crucible-closing pit recited therein are hinged as a unit to the crucible cover in order that the crucible may remain open or closed at will.

8. In a crucible charger, in combination, a reciprocating melting pot, feed screws for advancing feed metal toward and into said melting pot, a pawl and ratchet for rotating said feed screws, means for imparting reciprocating movement to said pawl regardless of its engagement with or disengagement from said ratchet, a resilient support for causing said melting pot to reciprocate varying distances according to the quantity of molten metal therein, and interconnecting means between said pawl and said pot, for causing the reciprocations of said pawl to effect the advance of said feed metal intermittently with limited reciprocations of said pot as determined by its depletion of molten metal, said interconnecting means serving also to prevent the advance of the feed metal when a full supply of molten metal causes said pot to reciprocate an extreme distance.

9. A combination as specified in claim 8, including also a resilient lever for operating the pawl and ratchet recited therein, means for operating said lever and causing the expansion thereof when the feed screws are unduly resisted, a bell associated with said lever, means whereby said bell is sounded when said lever is expanded, and means whereby said lever is rendered inoperative relative to its function following the expansion thereof.

10. In a crucible charger for linotype machines, a combination as specified in claim 8, including also a reciprocating elevator arm common to linotype machines, a resilient lever for operating the aforementioned pawl and ratchet, said lever being capable of expansion when unduly resisted in its action, and interconnecting means between said resilient lever and said elevator arm whereby said arm is hindered in its movement when said lever is expanded, as and for the purpose specified.

11. In a crucible charger for linotype machines, a combination as specified in claim 8, including also an extension from the melting pot recited therein, an elevator arm common to linotype machines and movable in time with the reciprocations of said melting pot, and interengaging means between said elevator arm and said pot extension whereby said arm is hindered in its movement when the reciprocations of said melting pot are unduly limited in extent, as and for the purposes specified.

12. In a crucible charger for linotype machines a combination as specified in claim 8, including also an extension from the melting pot recited therein, a bell thereon, an elevator arm common to linotype machines and movable in time with the reciprocations of said melting pot, and a device on said arm for causing said bell to be sounded when the reciprocations of said melting pot are unduly limited in extent, as and for the purposes set forth.

13. In a pot charger, a crucible, means for advancing feed metal to said crucible, a primary lever for operating said advancing means, a pivoted secondary lever normally functioning as part of said primary lever, a cam-roller on said secondary lever, a cam for engaging said roller and thereby imparting movement to said primary lever, and a resilient connection between said primary lever and said secondary lever, whereby said cam-roller is permitted to move about its pivot to a non-obstructing position when said cam is turned in a contrary direction.

14. In a crucible charger, in combination, feed screws for supplying feed metal to a melting pot, an inverted channel for supporting the feed metal, brackets on each end of said inverted channel for supporting said screws, fore and aft supporting shafts for said inverted channel, a channeled brace connecting said supporting shafts, open latches in said inverted channel for permitting its engagement with and disengagement from said supporting shafts without removing said channeled brace, and a prop pivoted on said forward shaft and retained within said channeled brace when said inverted channel is in engagement with its forward support, said prop being capable of spacing said inverted channel away from its forward support in order to change the position of the crucible charger according to the character of feed metal available for use therewith.

15. A combination as specified in claim 14, including also a pawl and ratchet for rotating the feed screws recited therein, an operating lever for said pawl, and a sling and connecting rod for making and breaking the connection between said pawl and ratchet, said operating lever, pawl, sling and connecting rod being supported in the aforementioned inverted channel and movable therewith to and from a raised or lowered position as determined by the character of feed metal available for use.

16. In a crucible charger, in combination, a reciprocating melting pot, means for advancing feed metal thereto, means for causing said melting pot to reciprocate varying distances according to the weight of its contents, and means whereby reciprocations thereof associated with a depleted melting pot will cause said advancing means to become operative to effect the replenishment of the melting pot.

17. In a crucible charger, in combination, a reciprocating melting pot, feed metal for replenishing said melting pot, premelting means for adding said feed metal to the pot contents in melted condition, means for causing said melting pot to reciprocate varying distances according to the weight of its contents, and means whereby reciprocations of the melting pot associated with a depleted condition thereof will cause said premelting means to become effective for replenishing said melting pot.

18. In a crucible charger, in combination, a melting pot to be replenished, feed metal for replenishing said melting pot, means for advancing said feed metal intermittently to said pot, a premelter for melting the feed metal into the pot, and means whereby the intermittent movement of said feed metal will cause said preheater to become operative and non-operative in time with the advance of the feed metal to the pot.

19. In a crucible charger, in combination, a melting pot to be replenished, a mercury container therein, a mercury-controlled float within said mercury container, means for automatically supplying feed metal to said melting pot, and means whereby the varying height of the molten metal in the pot will cause said mercury-controlled float to render said feed-metal supplying means effective or non-effective according to the depleted or replenished condition of the melting pot.

20. In a crucible charger, in combination, a melting pot to be replenished, means for supplying feed material thereto, a mercury-controlled float for rendering said feed-supply means intermittently operative or non-operative according to the depleted or replenished condition of the melting pot, and means co-operating with said float whereby the action of said feed-supply means may be retarded or advanced according to the temperature of the pot contents, for the purpose of controlling the temperature of the pot contents.

21. In a crucible charger, in combination, a melting pot, feed screws for advancing feed metal toward and into said melting pot, a pawl and ratchet for rotating said feed screws, means for imparting reciprocating movement to said pawl regardless of its engagement with or disengagement from said ratchet, a float supported by the molten metal within the pot, and interconnecting means between said float and said pawl for causing said feed screws to be rotated intermittently according to the depleted or replenished condition of the melting pot.

22. In a crucible charger for typecasting machines, a reciprocating melting pot, means for advancing feed metal to the pot, a hit-and-miss device actuating by the typecasting machine for rendering said feed-metal advancing means operative or non-operative according to the depleted or replenished condition of the melting pot, means controlled by the reciprocations of the pot for rendering said hit-and-miss device effective only when the pot is depleted, and a float controlled by the level of the molten metal within the pot for likewise rendering said hit-and-miss device effective only when the pot is depleted, said float means and the means controlled by the reciprocations of the pot serving as a check one upon the other for insuring the replenishing of the pot regardless of the failure of either means to respond to the fluctuations of the molten metal within the pot.

23. In a crucible charger, in combination, a reciprocating melting pot, mechanism for advancing feed metal to the pot, and a hit-and-miss device for rendering the feed-metal advancing mechanism alternately operative and non-operative for the purpose of maintaining the molten metal in the pot at a predetermined level, said hit-and-miss device being controlled by the reciprocations of the melting pot.

24. In a crucible charger, in combination, a melting pot to be replenished, apparatus for supplying replenishing material to said pot and a pit formed within the lid of the melting pot and having self-closing movable walls capable of easing the replenishing material to the crucible, said pit being movable as a unit in and out of the pot opening for the purpose of providing access to the crucible.

25. In a crucible charger, in combination, a reciprocating melting pot, feed metal therefor, means for maintaining the molten metal in the pot at a predetermined level under normal temperature conditions and at a different level under abnormal temperature conditions, and co-acting means whereby the movement of the reciprocating pot will serve to reduce the source of heat when the pot contents is at a maximum height and retains an abnormal temperature.

26. In a crucible charger for slug-casting machines, a reciprocating melting pot, means for supplying feed metal thereto at intervals sufficing to maintain the pot contents at a predetermined level when the pot contents is at a normal temperature, means for automatically raising the level of the pot contents for maintaining a normal temperature thereof, means for hindering the reciprocations of the melting pot when the pot contents are abnormally high and at an abnormal temperature, and means whereby the hindered reciprocations of the pot will serve to notify an operator of the combination of abnormal conditions.

27. In a crucible charger, in combination, a melting pot, means for supplying feed metal thereto at intervals sufficing to maintain the contents thereof at a predetermined level when at a normal temperature, means for increasing the supply of feed metal when the temperature of the pot contents is above normal, and means for stopping the supply of feed metal when the temperature of the pot contents is below normal.

In testimony whereof I have hereunto affixed my signature this 2nd day of August, 1922.

GEORGE E. MARLATT.